US008638369B2

United States Patent
Tsai

(10) Patent No.: US 8,638,369 B2
(45) Date of Patent: Jan. 28, 2014

(54) BACK PANEL FOR A PORTABLE ELECTRONIC DEVICE WITH DIFFERENT CAMERA LENS OPTIONS

(75) Inventor: Richard Tsai, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 351 days.

(21) Appl. No.: 12/964,626

(22) Filed: Dec. 9, 2010

(65) Prior Publication Data

US 2012/0147193 A1    Jun. 14, 2012

(51) Int. Cl.
*H04N 5/33* (2006.01)

(52) U.S. Cl.
USPC .......................................... 348/164

(58) Field of Classification Search
USPC ................................... 348/61–164
See application file for complete search history.

(56) References Cited

U.S. PATENT DOCUMENTS

| 2005/0101348 | A1  | 5/2005  | Wang |
| 2005/0253923 | A1* | 11/2005 | Komori et al. ............. 348/14.02 |
| 2007/0077061 | A1* | 4/2007  | Watanabe et al. ............ 396/493 |
| 2007/0280677 | A1* | 12/2007 | Drake et al. .................. 396/429 |
| 2008/0013322 | A1* | 1/2008  | Ohkawa ........................ 362/311 |
| 2011/0013063 | A1* | 1/2011  | Yamamoto et al. ........... 348/294 |
| 2011/0134293 | A1* | 6/2011  | Tanaka .......................... 348/280 |
| 2012/0099015 | A1* | 4/2012  | Viinikanoja et al. .......... 348/344 |
| 2012/0320340 | A1* | 12/2012 | Coleman, III ................ 351/208 |

FOREIGN PATENT DOCUMENTS

| CN | 1533126 A    | 9/2004  |
| CN | 2666062 Y    | 12/2004 |
| JP | 2002-271665  | 9/2009  |

* cited by examiner

*Primary Examiner* — Joseph Ustaris
*Assistant Examiner* — Talha Nawaz
(74) *Attorney, Agent, or Firm* — Blakely, Sokoloff, Taylor & Zafman LLP

(57) ABSTRACT

A portable electronic device includes a digital imaging subsystem with a lens having an optical axis. A case encloses and supports the digital imaging subsystem in a first defined positional relationship to the case. A removable panel is coupled to the case and held in a second defined positional relationship to the case that covers the digital imaging subsystem without the removable panel being directly connected to the digital imaging subsystem. An optical component is supported by the removable panel such that the optical component is aligned with the optical axis and alters optical characteristics of the digital imaging subsystem. The device may include a power supply and an electronic control system coupled to the digital imaging subsystem and the power supply enclosed in and supported by the case. Electrical connectors may couple the power supply and the electronic control system to an electrical component on the removable panel.

22 Claims, 2 Drawing Sheets

BACK PANEL FOR A PORTABLE ELECTRONIC DEVICE WITH DIFFERENT CAMERA LENS OPTIONS

BACKGROUND

FIELD

Embodiments of the invention relate to the field of digital cameras; and more specifically, to configurable optics for digital cameras.

BACKGROUND

Digital image capturing devices include cameras, portable handheld electronic devices, and electronic devices. Often these digital image capturing devices are highly compact. They may be integrated as part of a multifunction device such as a personal digital assistant (PDA) or mobile telephone.

A digital imaging subsystem that includes a lens and an image sensor may be provided as a single sub-assembly for building the device so that all components requiring high precision optical alignment are pre-assembled. This permits economy of scale in the production of the digital imaging subsystem, which may used in many different devices. This also lowers the cost of producing the device that includes the digital imaging subsystem because the assembly process for the device does not have to include the procedures for providing optical alignment of the digital imaging components.

As the quality of digital images that can be obtained with highly compact devices increases, there is increasing demand for sophisticated features previously found only in high-end digital cameras, such as digital single lens reflex (DSLR) cameras. Cameras providing features such as supplementary lenses and filters, optical zoom, optical image stabilization, and other features useful in capturing high quality images have typically been much larger than multifunction devices that include a camera.

High-end digital cameras may be constructed with a camera body that provides a mechanical receptacle for receiving a variety of lenses and aligning them precisely with the image sensor in the camera body. These replaceable lenses and non-replaceable lenses on other digital cameras may provide a lens and filter mount at the front of the lens that can receive a lens or filter that is connected directly to the lens, thus ensuring a precise optical alignment with the lens.

The use of a pre-assembled digital imaging subsystem in a highly compact device precludes the use of replaceable lenses. Further, the lenses in a pre-assembled digital imaging subsystem are much smaller than those found in a dedicated digital camera and they do not provide a mount for filters or additional lenses. The digital imaging subsystem is typically enclosed within the case of the device to protect the digital imaging subsystem. The enclosure generally prevents direct access to the lens of the digital imaging subsystem for the purpose of providing any sort of supplementary optics, especially if the supplementary optics must be precisely aligned with the image sensor. Thus it is necessary to offer a number of different models of a compact device if a range of camera features is to be offered. Further, the camera features of a model are limited to what can be provided with a single optical configuration.

It would be desirable to provide a structure for a compact device that allows the end user to reconfigure the optical arrangement of the device while retaining the benefits of assembling the device using a pre-assembled digital imaging subsystem.

SUMMARY

A portable electronic device includes a digital imaging subsystem with a lens having an optical axis. A case encloses and supports the digital imaging subsystem in a first defined positional relationship to the case. A removable panel is coupled to the case and held in a second defined positional relationship to the case that covers the digital imaging subsystem without the removable panel being directly connected to the digital imaging subsystem. An optical component is supported by the removable panel such that the optical component is aligned with the optical axis and alters optical characteristics of the digital imaging subsystem. The device may include a power supply and an electronic control system coupled to the digital imaging subsystem and the power supply enclosed in and supported by the case. Electrical connectors may couple the power supply and the electronic control system to an electrical component on the removable panel.

Other features and advantages of the present invention will be apparent from the accompanying drawings and from the detailed description that follows below.

BRIEF DESCRIPTION OF THE DRAWINGS

The invention may best be understood by referring to the following description and accompanying drawings that are used to illustrate embodiments of the invention by way of example and not limitation. In the drawings, in which like reference numerals indicate similar elements.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

Figure 1:
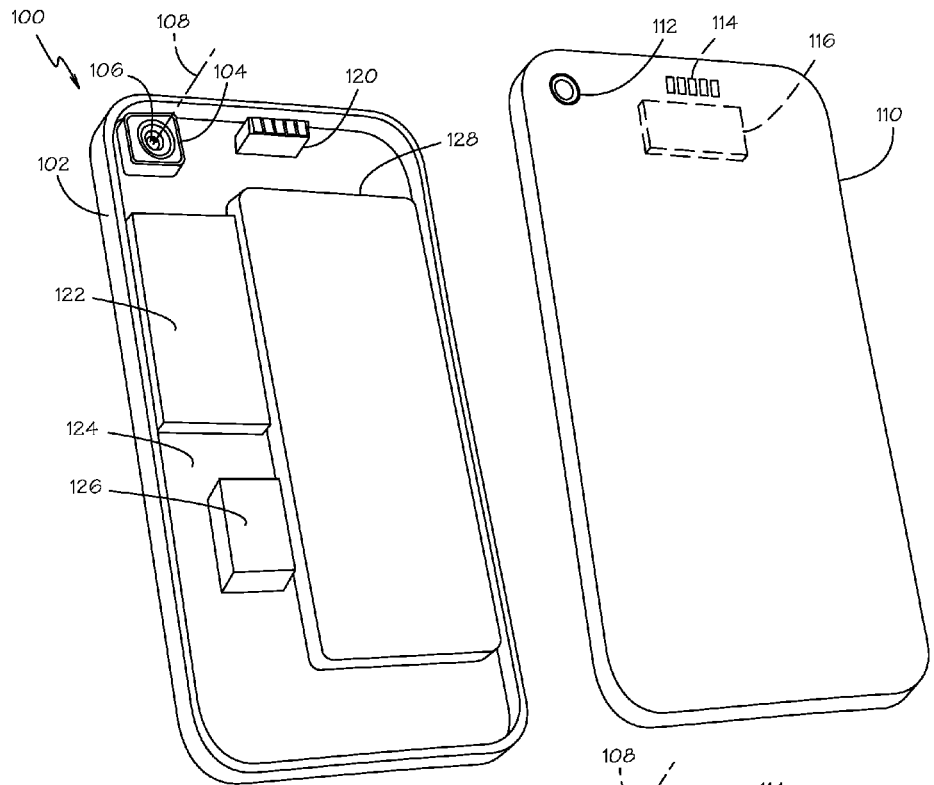
FIG. 1 is a simplified block diagram of a portable electronic device to capture a digital image in an exploded view.
Figure 2:
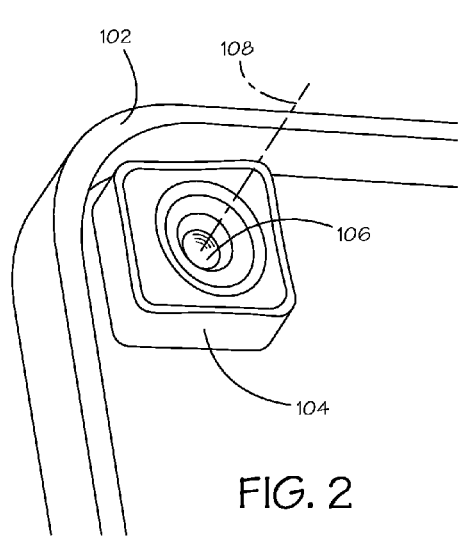
FIG. 2 is an enlarged portion of the device shown in FIG. 1 in the region of a digital imaging subsystem.

FIG. 1 is a simplified block diagram of a portable electronic device 100 to capture a digital image. A case 102 encloses and supports a digital imaging subsystem 104 in a first defined positional relationship to the case. The digital imaging subsystem 104 includes a lens 106 having an optical axis 108 (shown enlarged in FIG. 2 which is an enlarged portion of the device 102 in the region of the digital imaging subsystem 104). The image forming components of the digital imaging subsystem 104 are precisely aligned along the optical axis 108. For the purposes of this specification, terms referring to precise optical alignment should be understood to mean alignment with sufficient precision to produce an image with acceptable optical quality.

Figure 3:
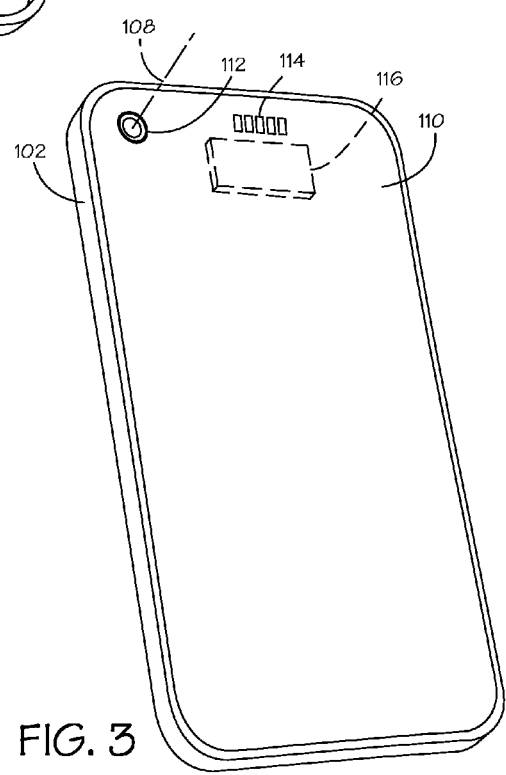
FIG. 3 is the device shown in FIG. 1 in an assembled view.

FIG. 3 shows a removable panel 110 coupled to the case 102. FIG. 1 shows the removable panel 110 separated from the case 102. The removable panel 110 is held by the case 102 in a second defined positional relationship to the case. The removable panel 110 covers the digital imaging subsystem 104 without the removable panel being directly connected to the digital imaging subsystem. An optical component 112 is supported by the removable panel 110 such that the optical component is aligned with the optical axis 108 and alters optical characteristics of the digital imaging subsystem 104.

Since the digital imaging subsystem 104 and the removable panel 110 are both held by the case 102 is defined positions with respect to the case, the optical component 112 supported by the removable panel 110 is precisely aligned with the optical axis 108 of the lens 106 without the use of a direct connection between the optical component and the digital imaging subsystem 104. This makes it possible for a user to reconfigure the optics of the device while retaining the benefits of providing the basic image capturing functionality with a pre-assembled digital imaging subsystem 104.

Near-infrared (IR) light, which spans from 700 nanometers (nm) up to about 1000 nm, is beyond what the human eye can see, but most digital image sensors can detect it and make use of it. Normally an IR-cut filter is used to prevent IR light from reaching the image sensor so that the IR light does not distort the colors of images as the human eye sees them. Rather than include the IR-cut filter in the digital imaging subsystem 104 as is normally done, the IR-cut filter can be supported by the removable panel 110 as the optical component 112. This permits the IR-cut filter to be removed for capturing black and white images at very low light levels. Without the IR-cut filter the camera's light sensitivity may extend to 0.001 lux or lower.

In another embodiment, the optical component 112 supported by the removable panel 110 is a close up lens that reduces the minimum focal distance of the digital imaging subsystem 104. This permits the camera to be used for extreme close-up photography.

In yet another embodiment, the optical component 112 supported by the removable panel 110 is a lens baffle that reduces the transmission of extraneous light to the digital imaging subsystem. The lens baffle may be provided in combination with a supplementary lens that increases the focal length of the digital imaging subsystem 104 and reduces the field of view. The lens baffle is closely matched to the reduced field of view so that light that is outside the field of view is not reflected onto the image sensor to degrade the acquired image.

The device 100 may include a power supply 128, such as a battery. An electronic control system 122 is electrically coupled to the digital imaging subsystem 104 and the power supply 128. The power supply 128 and electronic control system 122 are enclosed in and supported by the case 102 along with the digital imaging subsystem 104. The digital imaging subsystem 104, power supply 128, and electronic control system 122 may be assembled to a printed wiring board 124 (PWB) that provides the coupling between these components. The printed wiring board 124 may be fastened to the case 102 and thereby cause the components to the supported by the case.

A first electrical connector 120 may be coupled to the power supply 128 and the electronic control system 122. The first electrical connector 120 is enclosed in and supported by the case 102, such as by being assembled to the PWB 124. The removable panel 110 may include a second electrical connector 114 that is coupled to the first electrical connector 120 when the removable panel is coupled to the case 102. An electrical component 116 may be supported by the removable panel 110 and coupled to the second electrical connector 114 to receive power from the power supply 128 and/or control signals from the electronic control system 122.

In one embodiment, the optical component 112 is an optical image stabilizer and the electrical component 116 is an interface that couples the optical image stabilizer to control signals from the electronic control system 122 and power from the power supply 128. A motion sensor 126 may be included in the case 102 and coupled to the electronic control system 122. The electronic control system 122 may process signals from the motion sensor 126 and generate signals that are provided to the electrical component 116 on the removable panel 110 which controls the optical image stabilizer to optically cancel out the motion sensed by the motion sensor.

In another embodiment the motion sensor is on the removable panel. In this embodiment, motion sensor signals may be provided to the electronic control system in the case through the connectors. Alternatively, the motion sensor signals may be provided to the electrical component on the removable panel and processed to control the optical image stabilizer without the involvement of the electronic control system in the case.

In yet another embodiment the optical component 112 is an optical zoom assembly that adjusts the focal length of the digital imaging subsystem 104. The electrical component 116 is an interface that couples the optical zoom assembly to control signals from the electronic control system 122 and power from the power supply 128. The electronic control system 122 receives user input, such as a switch closure or a touch screen gesture, to control the setting of the optical zoom assembly and provides control signals to electrical component 116 to adjust the optical zoom assembly according to the user input.

In still another embodiment the optical component 112 is a mechanical shutter that controls admission of light to the digital imaging subsystem 104. The electrical component 116 is an interface that couples the mechanical shutter to control signals from the electronic control system 122 and power from the power supply 128. The mechanical shutter may provide better control of the exposure of the image acquired by the digital imaging subsystem 104 under certain circumstances such as photographing quickly moving subjects.

Figure 4:
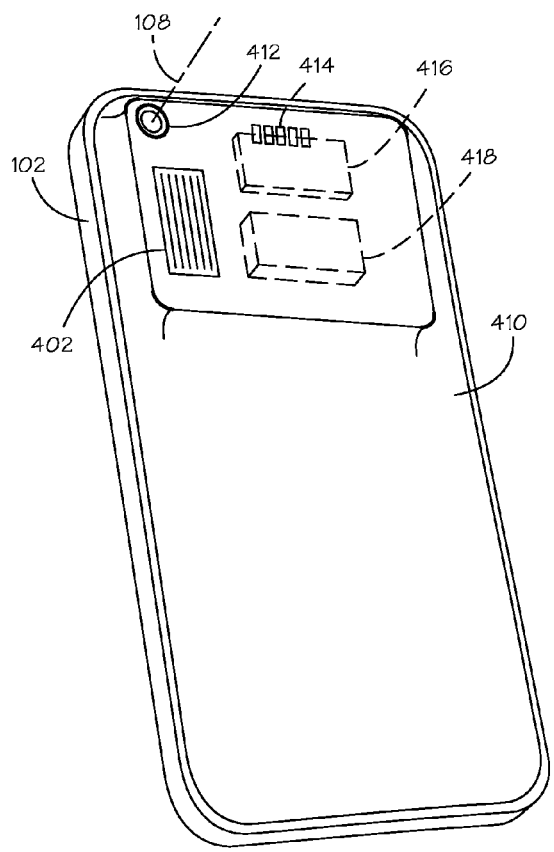
FIG. 4 is an assembled view of another portable electronic device to capture a digital image.

As shown in FIG. 4, the portable electronic device may include a stroboscopic flash 402 supported by the removable panel 410. The electrical component 416 is an interface that couples the stroboscopic flash 402 to control signals from the electronic control system and power from the power supply through an electrical connector 414 that is coupled to a corresponding electrical connector in the case 102. The removable panel 410 may support an auxiliary power supply 418, such as a capacitor or a battery, to provide additional power for the stroboscopic flash 402. As shown, some embodiments may use a removable panel 410 that extends from the case 102 over part or all of the panel to provide space for bulky components or to support the optical component 412 at a greater distance from the digital imaging subsystem.

Figure 5:
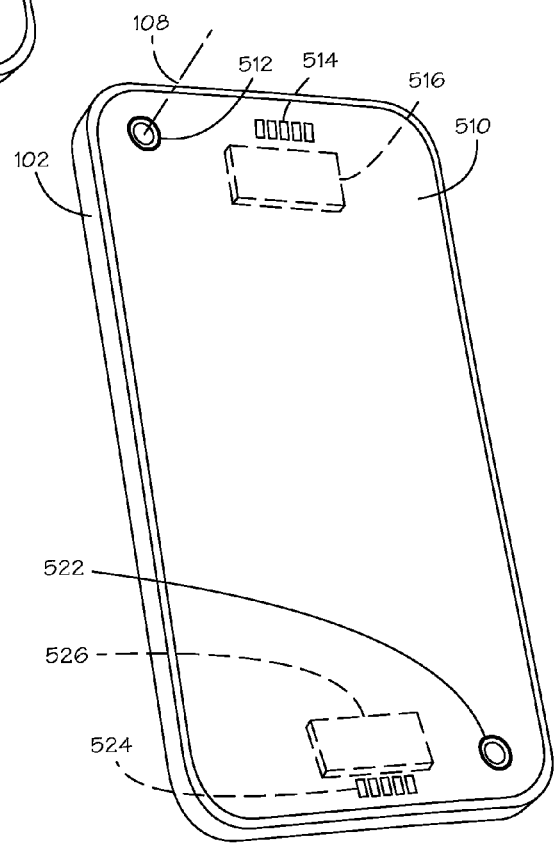
FIG. 5 is an assembled view of still another portable electronic device to capture a digital image.

As shown in FIG. 5 the portable electronic device may provide a removable panel 510 that can be selectively held by the case 102 in either of two defined positional relationship to the case. The removable panel 510 may include two optical components 512, 522 each of which provides different optical characteristics of the digital imaging subsystem according to which of the two optical components is aligned with the optical axis 108. In some embodiments one positional relationship of the removable panel 510 provides the unaltered optical characteristics of the digital imaging subsystem.

The removable panel 510 may include two electrical components 516, 526 and two electrical connectors 514, 524. The electrical component associated with the optical component that is aligned with the optical axis 108 will be connected to an electrical connector in the case 102. In some embodiments one or both of the two optical components 512, 522 is a passive component, such as a filter or a fixed lens, and an electrical component and connector will not be provided for the passive optical component.

Using embodiments of the invention a portable electronic device may be efficiently assembled and provide configurable optics for digital image acquisition. A case is provided and a digital imaging subsystem is assembled to the case in a first defined positional relationship to the case. The digital imaging subsystem is a pre-assembled unit that includes a lens having an optical axis aligned with an image sensor. A removable panel is coupled to the case to cover the digital imaging subsystem. The removable panel is held by the case in a second defined positional relationship to the case without the removable panel being directly connected to the digital imaging subsystem. The removable panel includes an optical component supported by the removable panel such that the optical component is aligned with the optical axis and alters optical characteristics of the digital imaging subsystem.

A power supply and an electronic control system are assembled to the case. The electronic control system is coupled to the digital imaging subsystem and the power supply, such as by assembly to a printed wiring board (PWB). Aa first electrical connector is assembled to the case and coupled to the power supply and the electronic control system, such as by assembly to the PWB. A second electrical connector and an electrical component are assembled to the removable panel. The second electrical connector is coupled to the first electrical connector by coupling the removable panel to the case. This allows the electrical component that is provided as part of the removable panel to receive power and control signals from the power supply and the electronic control system in the case. The electrical component may also provide signals to the electronic control system to indicate the status of the optical component on the removable panel.

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications may occur to those of ordinary skill in the art. The description is thus to be regarded as illustrative instead of limiting.

What is claimed is:

1. A portable electronic device comprising:
    a digital imaging subsystem that includes a lens having an optical axis;
    a case that encloses and supports the digital imaging subsystem in a defined positional relationship to the case;
    a removable panel coupled to the case, the removable panel covering the digital imaging subsystem without the removable panel being directly connected to the digital imaging subsystem, the removable panel being removable and rotatable to be held by the case in one of a first orientation and a second orientation relative to the case; and
    an optical component supported by the removable panel such that the optical component is aligned with the optical axis and alters optical characteristics of the digital imaging subsystem when the removable panel is held in the first orientation, and the optical component is removed from the optical axis and does not alter optical characteristics of the digital imaging subsystem when the removable panel is held in the second orientation.

2. The portable electronic device of claim 1, wherein an optical component is supported by the removable panel such that the optical component is aligned with the optical axis when the removable panel is held by the case in one of the first orientation and the second orientation relative to the case.

3. The portable electronic device of claim 2, wherein the optical component is a close up lens that reduces the minimum focal distance of the digital imaging subsystem.

4. The portable electronic device of claim 2, wherein the optical component is a lens baffle that reduces the transmission of light that is outside a field of view of the digital imaging subsystem.

5. The portable electronic device of claim 2, further comprising:
    a power supply;
    an electronic control system coupled to the digital imaging subsystem and the power supply;
    a first electrical connector coupled to the power supply and the electronic control system;
    wherein the power supply, the electronic control system, and the electrical connector are enclosed in and supported by the case; and
    wherein the removable panel includes
    a second electrical connector that is coupled to the first electrical connector when the removable panel is coupled to the case, and
    an electrical component that is coupled to the second electrical connector.

6. The portable electronic device of claim 5, wherein the optical component is an optical image stabilizer and the electrical component is an interface that couples the optical image stabilizer to control signals from a motion sensor and the electronic control system, and power from the power supply.

7. The portable electronic device of claim 5, wherein the optical component is an optical zoom assembly that adjusts the focal length of the digital imaging subsystem and the electrical component is an interface that couples the optical zoom assembly to control signals from the electronic control system and power from the power supply.

8. The portable electronic device of claim 5, wherein the optical component is a mechanical shutter that controls admission of light to the digital imaging subsystem and the electrical component is an interface that couples the mechanical shutter to control signals from the electronic control system and power from the power supply.

9. The portable electronic device of claim 5, further comprising a stroboscopic flash supported by the removable panel, wherein the electrical component is an interface that couples the stroboscopic flash to control signals from the electronic control system and power from the power supply.

10. The portable electronic device of claim 2, wherein the digital imaging subsystem does not include an infrared cut filter and the optical component supported by the removable panel comprises an infrared cut filter supported by the removable panel, the infrared cut filter preventing infrared light from reaching the digital imaging subsystem only when the infrared cut filter is aligned with the optical axis.

11. A portable electronic device comprising:
    a first means for acquiring a digital image that includes a lens having an optical axis;
    a second means for enclosing and supporting the first means in a defined position;
    a third means for removably covering the first means, the third means being removable and rotatable to be held in one of a first orientation and a second orientation by the second means without the third means being directly connected to the first means; and a fourth means for altering optical characteristics of the first means, the fourth means supported by the third means such that the fourth means is aligned with the optical axis in the first orientation and not in the second orientation.

12. The portable electronic device of claim 11, wherein the fourth means is supported by the third means such that the fourth means is aligned with the optical axis when the third means is held in only one of the first orientation and the second orientation.

13. The portable electronic device of claim 12, wherein the fourth means is for reducing the minimum focal distance of the digital imaging subsystem.

14. The portable electronic device of claim 12, wherein the fourth means is for reducing the transmission of light that is outside a field of view of the digital imaging subsystem.

15. The portable electronic device of claim 12, further comprising:
   a fifth means for supplying power;
   a sixth means for providing electronic control signals to the first means;
   a seventh means for coupling the fifth means and the sixth means to the third means.

16. The portable electronic device of claim 15, wherein the fourth means is for optically stabilizing an image formed in the first means, the fourth means coupled to the seventh means to receive control signals from a ninth means for sensing motion and the sixth means, and power from the fifth means.

17. The portable electronic device of claim 15, wherein the fourth means is for adjusting the focal length of the first means, the fourth means coupled to the seventh means to receive control signals from the sixth means and power from the fifth means.

18. The portable electronic device of claim 15, wherein the fourth means is for controlling admission of light to the first means, the fourth means coupled to the seventh means to receive control signals from the sixth means and power from the fifth means.

19. The portable electronic device of claim 15, further comprising an eighth means for momentarily illuminating a subject, the eighth means supported by the third means, the eighth means coupled to the seventh means to receive control signals from the sixth means and power from the fifth means.

20. A method of assembling a portable electronic device, the method comprising:
   providing a case;
   assembling a digital imaging subsystem to the case in a defined positional relationship to the case, the digital imaging subsystem including a lens having an optical axis; and
   removing, rotating, and coupling a removable panel to the case to cover the digital imaging subsystem without the removable panel being directly connected to the digital imaging subsystem, the removable panel being coupled to the case in one of a first orientation and a second orientation relative to the case, the removable panel including an optical component supported by the removable panel such that the optical component is aligned with the optical axis and alters optical characteristics of the digital imaging subsystem when the removable panel is in the first orientation, and the optical component is removed from the optical axis when the removable panel is in the second orientation.

21. The method of assembling a portable electronic device of claim 20, the method further comprising:
   assembling a power supply to the case;
   assembling an electronic control system to the case;
   coupling the electronic control system to the digital imaging subsystem and the power supply;
   assembling a first electrical connector to the case;
   coupling the first electrical connector to the power supply and the electronic control system;
   assembling a second electrical connector to the removable panel;
   assembling an electrical component to the removable panel;
   coupling the second electrical connector to the first electrical connector by coupling the removable panel to the case.

22. The portable electronic device of claim 12, wherein the first means does not include a means for reducing the transmission of infrared (IR) light to the first means and the fourth means comprises means for reducing the transmission of infrared (IR) light to the first means only when the fourth means is aligned with the optical axis.

* * * * *